(12) United States Patent
Cili et al.

(10) Patent No.: US 9,282,443 B2
(45) Date of Patent: Mar. 8, 2016

(54) SHORT MESSAGE SERVICE (SMS) MESSAGE SEGMENTATION

(71) Applicant: Apple Inc., Cupertino, CA (US)

(72) Inventors: Gencer Cili, Santa Clara, CA (US); Christopher E. Hobbs, San Jose, CA (US); Devrim Varoglu, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 79 days.

(21) Appl. No.: 14/133,493

(22) Filed: Dec. 18, 2013

(65) Prior Publication Data

US 2015/0172883 A1  Jun. 18, 2015

(51) Int. Cl.
*H04W 4/14* (2009.01)
*G06F 17/24* (2006.01)
*G06F 17/21* (2006.01)
*G06F 17/22* (2006.01)

(52) U.S. Cl.
CPC ............. *H04W 4/14* (2013.01); *G06F 17/2229* (2013.01); *G06F 17/24* (2013.01)

(58) Field of Classification Search
CPC ....... H04W 4/14; H04W 4/12; H04W 88/184; H04L 12/5895; H04M 1/72552; H04Q 7/20; G06F 17/217; G06F 17/2229
USPC .......... 455/466; 715/244, 251, 272, 256, 258, 715/780; 709/206, 207
See application file for complete search history.

(56) References Cited

U.S. PATENT DOCUMENTS

| | | | | |
|---|---|---|---|---|
| 6,874,122 | B1* | 3/2005 | Bates et al. | 715/236 |
| 8,965,421 | B1* | 2/2015 | Sanjeev | 455/466 |
| 2002/0058522 | A1* | 5/2002 | Kim et al. | 455/466 |
| 2003/0131311 | A1* | 7/2003 | McNamara | 714/809 |
| 2007/0087766 | A1* | 4/2007 | Hardy et al. | 455/466 |
| 2008/0113677 | A1* | 5/2008 | Madnawat | 455/466 |
| 2010/0179991 | A1* | 7/2010 | Lorch et al. | 709/206 |
| 2011/0222688 | A1* | 9/2011 | Graham et al. | 380/247 |
| 2012/0199644 | A1* | 8/2012 | Kearney | 235/375 |

* cited by examiner

*Primary Examiner* — Patrick Edouard
*Assistant Examiner* — B. M. M Hannan
(74) *Attorney, Agent, or Firm* — Downey Brand LLP

(57) ABSTRACT

Disclosed herein is a technique for preventing words from spanning across message blocks of a short message service (SMS) message. An SMS message is generated at a source wireless device, and an SMS manager, executing on the source wireless device, determines whether any words in the SMS message span across two or more message blocks of the SMS message. When so determined, the SMS manager attempts to shift characters of the SMS message across the message blocks to eliminate any word spanning. When the attempt to shift the characters between message blocks requires at least one additional message block to transmit the complete SMS message, the SMS manager gathers information about the destination wireless device to determine whether it is necessary to carry out the aforementioned shifting prior to sending the message blocks. The SMS manager then transmits the message blocks either unmodified or modified (i.e., shifted).

20 Claims, 5 Drawing Sheets

SHORT MESSAGE SERVICE (SMS) MESSAGE SEGMENTATION

TECHNICAL FIELD

The described embodiments relate generally to wireless device communications. More particularly, the present embodiments describe a technique for preventing words from spanning across two consecutive short message service (SMS) message blocks for a multi-part SMS message.

BACKGROUND

Short message service (SMS) messaging is a popular messaging platform that, despite evolving little over the years, continues to be offered by many wireless network providers and is utilized by a significant number of wireless devices. One example of the lack of evolution can be seen in the encoding schemes enforced by wireless network providers, which, for the most part, continue to allow only a limited number of characters to be included in each SMS message (e.g., 7-bit American Standard Code for Information Interchange (ASCII) encoding that limits an SMS message to one hundred and forty (140) characters). Such enforcement can be attributed to a variety of factors, e.g., an intent to increase the number of SMS messages that are required to send lengthier SMS messages that exceed the enforced per-SMS message character limit, which can significantly drive up revenue for the wireless network provider.

Text input advancements, among other things, have increased the average length of text-based messages that are transmitted between wireless devices. Voice dictation, for example, provided by Siri® on Apple's® iPhone®, enables users to dictate lengthy messages that would otherwise be condensed if they were manually entered, for example, via Text on 9 Keys (T9®) as used on early generation wireless devices for text input. As a result, the average SMS message (e.g., an SMS message with four hundred (400) characters) needs to be segmented into multiple SMS messages and transmitted/delivered as separate SMS messages (referred to herein as "message blocks"). Unfortunately, transmitting separate message blocks can result in a variety of problems, including delivering messages out of order, and spanning individual words across two different messages, which can degrade user experience.

In an attempt to cure the aforementioned problems, in some cases, concatenation information is transmitted along with the separate message blocks and can assist the wireless network provider and/or destination wireless device to properly handle the multiple message blocks upon delivery. For example, the concatenation information can be used to properly order the message blocks, and, in some cases, can be used to merge the message blocks so that they appear as a single SMS message on the destination wireless device. Unfortunately, this concatenation information can be stripped away or corrupted during transmission of the multi-part SMS message, especially when the transmission spans two different wireless network providers or two different wireless technologies. Consequently, multi-part SMS messages can cause readability issues in many cases as there is a large divide of wireless device users between wireless network providers.

SUMMARY

Representative embodiments set forth herein disclose a technique for segmenting an SMS message into two or more message blocks such that no words in the SMS message span across two of the two or more message blocks. In particular, when an SMS message is generated at a source wireless device and requested to be sent, an SMS manager, executing on the source wireless device, determines whether any words in the SMS message span across two of the two or more message blocks of the multi-part SMS message. When so determined, the SMS manager attempts to shift the characters of the SMS message across the message blocks to eliminate any word spanning. When the attempt to shift the characters between message blocks requires at least one additional message block to transmit the complete SMS message, the SMS manager attempts to gather information (e.g., wireless network provider information) about the destination wireless device to determine whether it is necessary or worthwhile to carry out the aforementioned shifting prior to sending the message blocks. Finally, the SMS manager transmits the message blocks either unmodified or modified (i.e., shifted).

One embodiment sets forth a method for shifting words that span across two message blocks of a short message service (SMS) message that is segmented into two or more message blocks, where each of the two or more message blocks shares a fixed character limit. The method includes the steps of, at a source wireless device: receiving a request to transmit the SMS message, identifying at least one word in the SMS message that spans across a first message block and a second message block of the two or more message blocks, and determining that shifting the at least one word from the first message block to the second message block would cause the fixed character limit of the second message block to be exceeded, and therefore would require an additional message block to transmit the SMS message. The method further include the steps of, at the source wireless device, and in response to determining, analyzing information about a destination wireless device that will receive the SMS to determine whether shifting the at least one word should be carried out. Finally, the source wireless device sends the two or more message to the destination wireless device when it is determined that the shifting should not be carried out; otherwise, the source wireless device shifts at least one word from the first message block to the second message block, and sends to the destination wireless device the two or more message blocks and the additional message block established by way of the shifting.

Another embodiment of the invention sets forth a non-transitory computer readable storage medium including instructions that, when executed by a processor, cause the processor to carry out a method for preventing a word from spanning across a first message block and a second message block of an electronic message. The method includes the steps of, at a source wireless device that includes the processor, determining that the word spans across the first message block and the second message block, shifting the word from the first message block to the second message block, and transmitting the electronic message to a recipient to which the electronic message is addressed.

Yet another embodiment of the invention sets forth a system that comprises a destination wireless device, a server configured to store information about at least the destination wireless device, and a source wireless device. The source wireless device is configured to receive a request to transmit an electronic message to the destination wireless device, where the electronic message is comprised of at least two message blocks, and includes at least one word that spans across the first message block and the second message block. The source wireless device is further configured to determine that shifting the at least word from the first message block to the second message block would require an additional message block to transmit the SMS message. In response to determining, the source wireless device issues a request to the server for the information about the destination wireless device, and analyzes the information to determine whether shifting the at least one word should be carried out. Finally, the source wireless device sends, to the destination wireless device, the electronic message as-is when it is determined that shifting the at least one word should not be carried out; otherwise the source wireless device carries out the shifting, and then sends, to the destination wireless device, the two or more message blocks and the additional message block established by way of the shifting.

Yet another embodiment of the invention sets forth a method for transmitting a message between a source wireless device and a destination wireless device. The method includes the steps of, at the source wireless device, receiving a request to transmit the message to the destination wireless device, identifying information about the destination wireless device, formatting the message based at least in part on the information identified about the destination wireless device, transmitting the formatted message to the destination wireless device.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Figure 1:
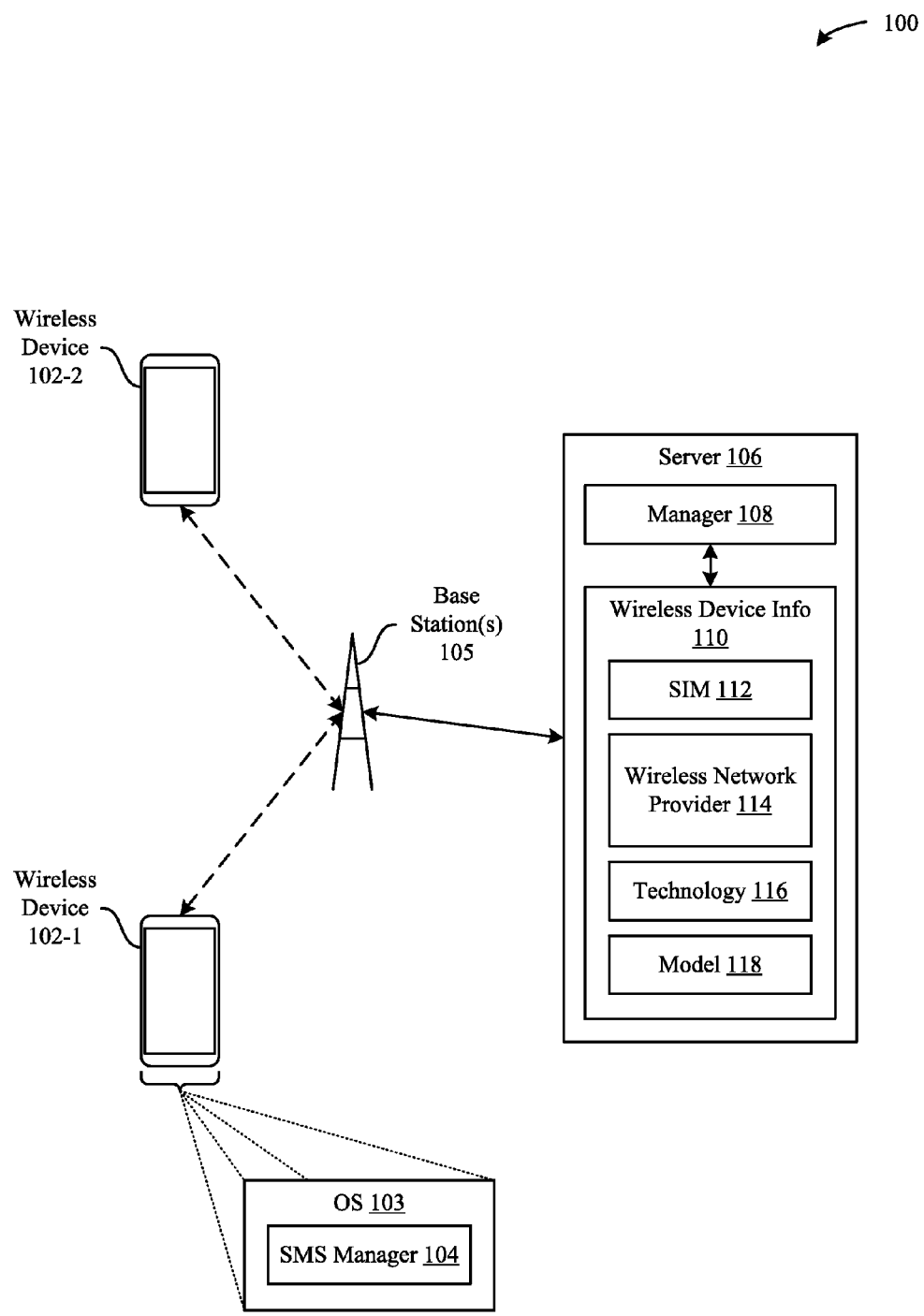
FIG. 1 illustrates a block diagram of a system in accordance with various embodiments.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

As described above, the embodiments described herein provide a technique for segmenting an SMS message into two or more message blocks such that no words in the SMS message span across two of the two or more message blocks. Importantly, this technique prevents readability issues from occurring at the destination wireless device when, for example, concatenation information for the two or more message blocks is not received at the destination wireless device, or when the destination wireless device is a legacy wireless device that cannot process concatenation information. In particular, readability issues are cured according to the techniques described herein, as the SMS message is delivered as "cleaned" message blocks that do not include portions of words at the beginnings/ends of the SMS messages.

Notably, combinations of characters can constitute a "word" depending on different sets of rules that can be applied. In particular, the character set and/or language type being employed can affect whether or not a combination of characters constitutes a "word" as used herein. For example, a predefined set of rules can establish that a combination of alphabetic characters that is preceded by and/or succeeded by space characters or any punctuation character included in a predefined set of punctuation characters (e.g., a comma or a period) constitutes a "word." In some cases, the "word" can include other punctuation characters, e.g., a hyphen, an apostrophe, etc. In another example, a predefined set of rules can be directed toward numerical values and establish that any combination of numeric characters that is preceded by and/or succeeded by space characters or any punctuation character included in a predefined set of punctuation characters can constitute a "word." In some cases, the numerical value can include one or more punctuation characters, e.g., periods (to represent decimal places) and commas (to separate values) and still constitute a "word." Thus, any set of rules can be implemented to specify the manner in which a combination of characters can constitute a "word."

To achieve the foregoing, an SMS manager is configured to execute on the source wireless device in the manner set forth herein. In particular, when an SMS message is generated at the source wireless device and requested to be sent, the SMS manager determines whether any words in the SMS message span across two of the two or more message blocks. For example, the SMS message "This is a test message", when constrained to twelve (12) characters per message block, can be segmented into a first message block that includes the characters "This is a te", and a second message block that includes the characters "st message". In this example, the word "test" spans across two message blocks, and, therefore, the SMS message is a candidate for an adjustment via SMS segmentation. When at least one word spans two consecutive message blocks, the SMS manager attempts to shift the characters of the SMS message across the message blocks to eliminate any of the aforementioned word spanning. When the attempt to shift the characters requires at least one additional message block to transmit the complete SMS message, the SMS manager attempts to gather information (e.g., wireless network provider information) about the destination wireless device to determine whether it is necessary or worthwhile to carry out the aforementioned shifting prior to sending the message blocks. As described in greater detail below, this information can include a wide variety of parameters and can additionally be used to alter the manner in which the SMS is transmitted, e.g., using different schemes to encode the SMS message, upgrading the SMS message to a Multimedia Message Service (MMS) message, and the like. Finally, the SMS manager transmits the message blocks either unmodified or modified (i.e., shifted) based on the aforementioned techniques.

FIG. 1 illustrates a block diagram of a system 100 configured to implement various representative embodiments. More specifically, FIG. 1 illustrates a high-level overview of the system 100, which, as shown, includes wireless devices 102-1 and 102-2, where the wireless device 102-1 is described herein as a "source" wireless device on which an SMS message is generated and segmented, and where the wireless device 102-2 is a "destination" wireless device to which the SMS message is addressed. As shown, at least the source wireless device 102-1 executes an operating system (OS) 103, which includes an SMS manager 104 that is configured to carry out the analysis and SMS segmentation described herein.

The system 100 of FIG. 1 also includes base stations 105 that enable the wireless devices 102 to communicate with one another and transmit, for example, SMS messages to one another. The base stations 105 can be operated by one or more wireless network providers (e.g., AT&T® and Verizon®) and provide voice and data communications to the wireless devices 102. The system 100 of FIG. 1 further includes a server 106, which, as shown, includes a manager 108 and wireless device information 110. As described in greater detail below, the manager 108 is configured to manage wireless device information 110 about the wireless devices 102, including, but not limited to, one or more of subscriber identity module (SIM) information 112 (e.g., phone number information tied to each of the wireless devices 102), wireless network provider information 114 (e.g., the wireless network provider to which each of the wireless devices 102 is subscribed), technology information 116 (e.g., the data connection type that is accessible to each of the wireless devices 102), and model information 118 (e.g., a manufacturer/model number of each of the wireless devices 102). Notably, and as described in greater detail below, the SMS manager 104 is configured to interface with the manager 108 to retrieve information about wireless devices 102 in order to make intelligent decisions when carrying out SMS segmentation. In some embodiments, the server 106 is included in network elements of a wireless network provider. In other embodiments, the server 106 is maintained by a third party separate from the wireless network provider.

Figure 2A:
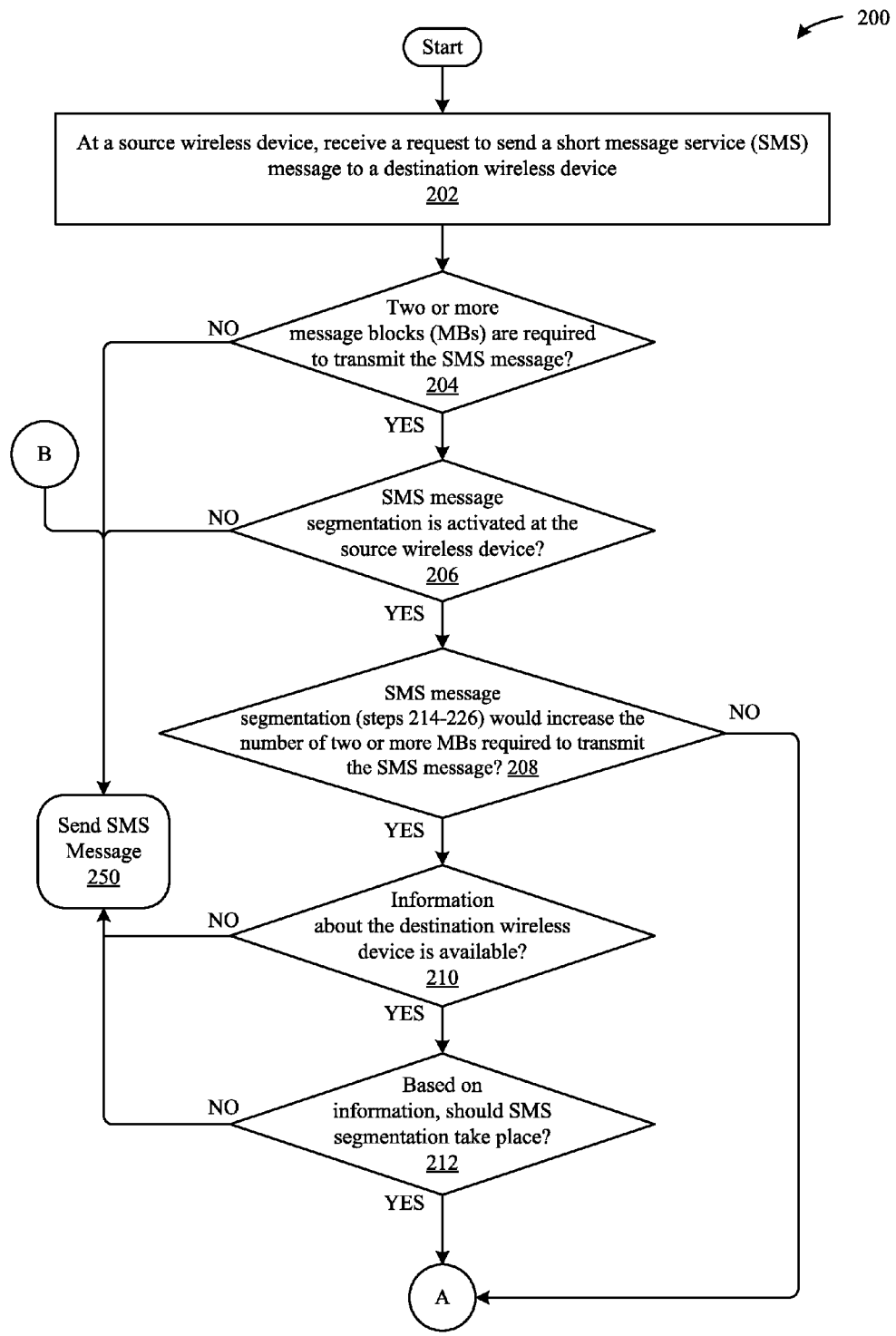
FIGS. 2A-2B illustrate a method carried out by an SMS manager executing on a wireless device of FIG. 1, according to some embodiments.
Figure 2B:
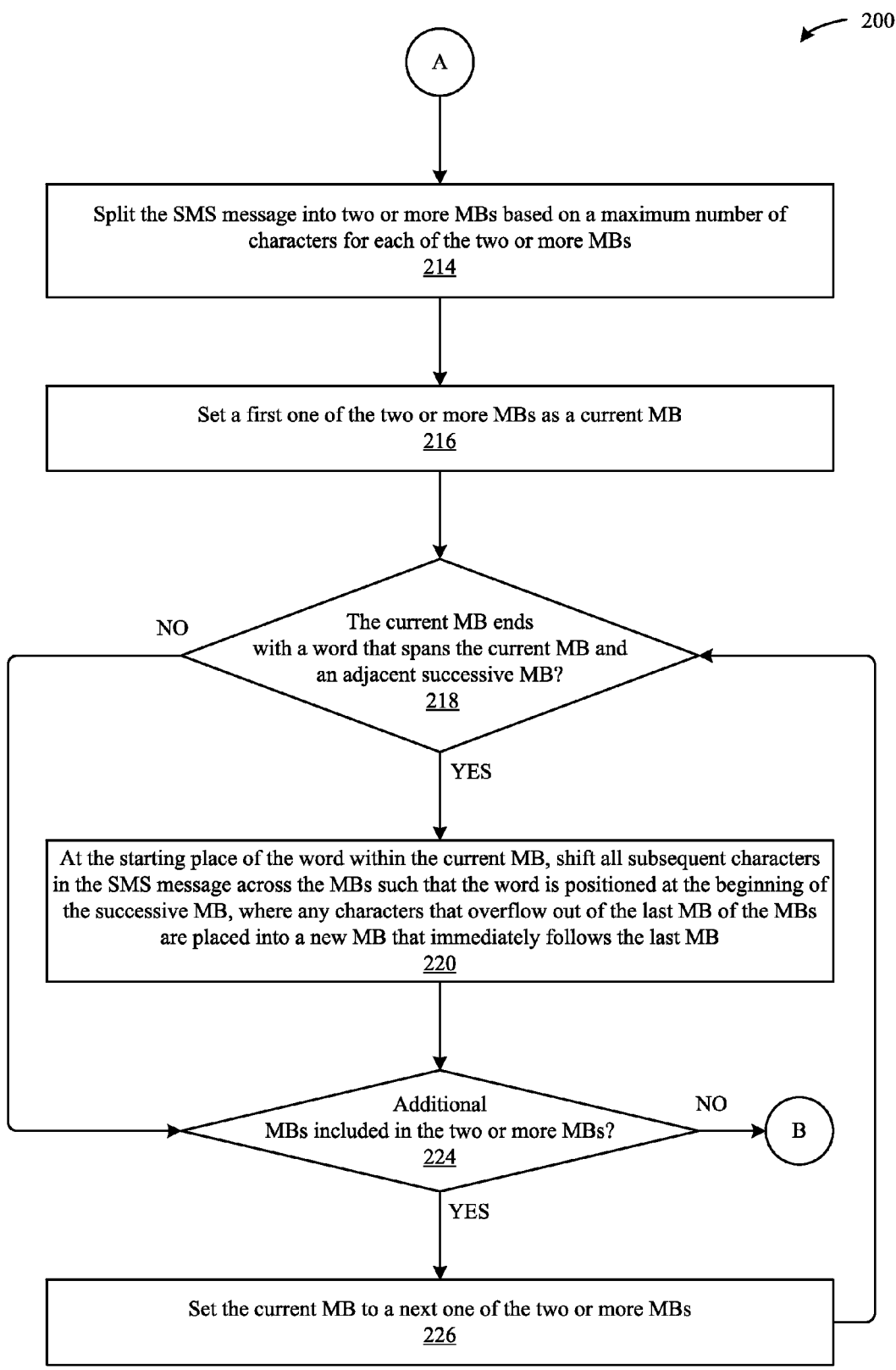

FIGS. 2A-2B illustrate a method carried out by the SMS manager 104 executing on the source wireless device 102-1 of FIG. 1, according to one embodiment. As shown, the method 200 begins at step 202, where the SMS manager 104 receives a request to send an SMS message to a destination wireless device (e.g., the wireless device 102-2). The SMS manager 104 can receive the request according to a variety of techniques, e.g., a user manually generating an SMS message, or an application executing on the source wireless device 102-1 that generates the SMS message on the user's behalf.

As previously described herein, the SMS manager 104 can be configured to segment a lengthy SMS message into two or more message blocks, where each of the two or more message blocks represents a different segment of the lengthy SMS message. As set forth above, the two or more message blocks typically share a fixed character limit that is based on an encoding scheme employed to package and send the SMS message. For example, if the SMS manager 104 is configured to implement 7-bit ASCII encoding, then one hundred and sixty (160) characters can be included in each message block that is packaged by the SMS manager 104. In another example, if the SMS manager 104 is configured to implement 8-bit Latin encoding, then one hundred and forty (140) characters can be included in each message block that is packaged by the SMS manager 104. In yet another example, if the SMS manager 104 is configured to implement 16-bit Unicode encoding, then eighty (80) characters can be included in each message block that is packaged by the SMS manager 104. In view of the foregoing, the encoding scheme that is implemented by the SMS manager 104 typically places a limit on the number of characters that can be included in each message block. As a result, the employed encoding scheme has an effect on the total number of message blocks that are required to send an SMS message. Consider, for example, a scenario where the SMS manager 104 employs 16-bit Unicode encoding and receives an SMS message that includes two hundred and twenty (220) characters. In this example scenario, the SMS manager 104, based on the eighty (80) character limit for 16-bit Unicode encoding, determines that at least three message blocks are required to transmit the SMS message using segments with no more than eighty (80) characters each.

Accordingly, for the method 200, at step 204, the SMS manager 104 determines whether two or more message blocks are required to transmit the SMS message. When, at step 204, the SMS manager 104 determines that two or more message blocks are required to transmit the SMS message, the method 200 proceeds to step 206. Otherwise, the message block requires only a single message block for transmission, and therefore would not benefit from the SMS segmentation technique described herein. In turn, when only a single message block is required for transmission, the method 200 proceeds to step 250, where the SMS message is sent without being modified by the remaining steps of the method 200 (e.g., at step 220 described below).

At step 206, the SMS manager 104 determines whether SMS message segmentation is activated at the source wireless device 102-1. In one embodiment, SMS segmentation can be activated and deactivated via a settings menu provided by the OS 103, and can provide the benefit of enabling the user to simply turn on/off the SMS segmentation feature at the source wireless device 102-1 if he or she so desires. When, at step 206, the SMS manager 104 determines that SMS message segmentation is activated at the source wireless device 102-1, the method 200 proceeds to step 208. Otherwise, the method 200 proceeds to step 250, where, as described above, the SMS message is sent without being modified by the remaining steps of the method 200.

Leading into step 208, it is important to note that, in some cases, it is unnecessary for the SMS manager 104 to analyze additional information (at steps 210-212) when determining whether or not to carry out SMS segmentation. In particular, in some cases, the total number of message blocks that result from SMS segmentation remains unchanged, and, therefore, the SMS manager 104 should simply proceed with the SMS segmentation. Consider, for example, a simple SMS message that includes the characters "This is a test note." Consider further that the SMS message is encoded into a first message block and a second message block that each has a sixteen (16) character limit, such that the first message block includes the characters "this is a test n", and the second message block includes the characters "ote.". In this example, to ensure that the message blocks are delivered to the destination wireless device 102-2 in an easy-to-read format, it is desirable to shift the "n" character included at the end of the first message block over to the second message block so that the word "note" does not span across the first and the second message block. Notably, the second message block can accommodate up to twelve

(12) additional characters, and, therefore, adequate space is available to carry out the shift of the "n" character from the first message block to the second message block without requiring a third (additional) message block to handle any overflow. Hence, in this example, SMS segmentation, when carried out by the SMS manager 104, produces an unchanged total number of message blocks required to send the SMS message. As a result, the SMS manager 104 can carry out SMS segmentation without needing to further consider additional information (e.g., SMS messaging plans, wireless network providers, technologies, etc., used by the source wireless device 102-1 and/or the destination wireless device 102-2), if any, that can be analyzed at steps 210-212.

Accordingly, at step 208, the SMS manager 104 determines whether SMS message segmentation would increase the number of two or more message blocks (as determined at step 204) required to transmit the SMS message. In one embodiment, the SMS manager 104 generates copies of the two or more message blocks and carries out the SMS segmentation (according to steps 214-226 described below) against the copies of the two or more message blocks, thereby leaving the original two or more message blocks unchanged. When the SMS manager 104 completes the SMS segmentation, the SMS manager 104 can determine whether additional message blocks are required to supplement the copies of the two or more message blocks, and, when so determined, analyze additional information (at steps 210-212) to further determine whether an actual SMS segmentation should be carried out. Accordingly, when, at step 208, the SMS manager 104 determines that SMS message segmentation increases the number of two or more message blocks (as determined at step 204) required to transmit the SMS message, the method 200 proceeds to step 210. Otherwise, the method 200 proceeds directly to step 214, where the SMS message segmentation is carried out according to steps 214-226 described below in greater detail.

At step 210, the SMS manager 104 determines whether information about the destination wireless device 102-2 is available. In one embodiment, the SMS manager 104 interfaces with the manager 108 executing on the server 106 and issues a request for information about the destination wireless device 102-2 based on, for example, recipient information (e.g., a phone number of the destination wireless device 102-2) included in the SMS message. In some cases, however, the manager 108 might not be accessible to the SMS manager 104. In this situation, the SMS manager 104 can be configured to refer to local memory (e.g., a cache) that stores information about individuals to whom SMS messages were previously and/or frequently sent. Thus, step 210 involves the SMS manager 104 seeking to access available information about the destination wireless device 102-2, which, as set forth above, can involve remote and/or local inquiries. When, at step 210, the SMS manager 104 determines that information about the destination wireless device 102-2 is available, the method 200 proceeds to step 212, which is described below in greater detail.

Alternatively, when, at step 210, the SMS manager 104 determines that information about the destination wireless device 102-2 is not available, the method 200 proceeds to step 250, where the SMS message is sent without being modified by the remaining steps of the method 200. Notably, and according to the method 200, the SMS manager 104 is configured to abort the SMS segmentation procedure at step 210 in this situation as 1) step 208 indicates that an additional message block would be required to transmit the SMS message, and 2) the SMS manager 104 cannot identify whether or not segmenting the SMS message (and transmitting the additional message block) would result in an undesirable outcome. A representative undesirable outcome includes incurring extra SMS messaging charges to the destination wireless device 102-2 when the destination wireless device 102-2 does not have unlimited electronic/SMS messaging (e.g., when the destination wireless device 102-2 is required to individually pay for each message that is transmitted). Another undesirable outcome includes unnecessarily segmenting the SMS even though the source wireless device 102-1 and the destination wireless device 102-2 are associated with the same wireless network provider (and therefore SMS concatenation would likely merge SMS messages correctly).

At step 212, the SMS manager 104 determines, based on the information about the destination wireless device 102-2 identified at step 210, whether or not SMS segmentation should take place. As described above, information about the destination wireless device 102-2 can be advantageously used to effectively determine whether sending the additional message block—which, again, would be required by way of the SMS segmentation—is worthwhile. Notably, the SMS manager 104 can employ any form of criteria to evaluate the information obtained at step 210 in order to carry out this determination. Examples of the information include details about a wireless account associated with the destination wireless device 102-2 (e.g., whether unlimited SMS messaging is included), details about a wireless network provider used by the destination wireless device 102-2 (e.g., AT&T® or Verizon®), details about a data connection technology used by the destination wireless device 102-2 (e.g., 3G, 4G, Long Term Evolution (LTE)), and details about a model of manufacture of the destination wireless device 102-2 (e.g., Apple's® iPhone® 5s).

These details can be used alone or in combination by the SMS manager 104 executing on the source wireless device 102-1 to identify an optimized manner in which to transmit the SMS message. For example, in one scenario, the SMS manager 104 can identify that the source wireless device 102-1 supports the same capabilities as the destination wireless device 102-2, but where the wireless network providers utilized by the source wireless device 102-1 and the destination wireless device 102-2 differ from one another. In this particular scenario, it can be beneficial for the source wireless device 102-1 to carry out the SMS segmentation, especially when the wireless network provider utilized by the destination wireless device 102-2 processes SMS messages in a different manner (e.g., uses a different encoding scheme) than the manner in which the wireless network provider utilized by the source wireless device 102-1 processes SMS messages.

Other examples of criteria include identifying whether the destination wireless device 102-2 supports similar technologies as the source wireless device. For example, if the source wireless device 102-1 has access to unlimited MMS messages, and determines that the destination wireless device has access to unlimited MMS messages as well, then the SMS manager 104 can be configured to automatically upgrade the SMS message to an MMS message to take advantage of the extended per-message character limit provided by way of MMS messages. Moreover, additional metrics can be used to further-optimize the manner in which messages are transmitted between the source wireless device 102-1 and the destination wireless device 102-2. For example, if each of the source wireless device 102-1 and the destination wireless device 102-2 support MMS messaging, then the SMS manager 104 can be configured to identify a version of hypertext transfer protocol (HTTP) for MMS that is supported by the destination wireless device 102-2. Consider, for example, when the HTTP version supported by the destination wireless device 102-2 is lower than the HTTP version supported by the source wireless device 102-1. In this example, the SMS manager 104 can downgrade the HTTP version used to format and transmit any MMS messages to the destination wireless device 102-2 to decrease the likelihood that formatting issues will occur when the destination wireless device 102-2 receives and displays the MMS messages.

It is noted that any of the above criteria can be expanded to include similar techniques, can be used in isolation or in combination, and can be weighted, such that SMS manager 104 can effectively determine whether the SMS segmentation or modification should be carried out. It is further noted that the manager 108 can, in addition to providing the wireless device information 110, provide additional wireless device information 110 and/or additional criteria to the SMS manager 104 so that the SMS manager 104 can employ up-to-date decision making.

When, at step 212, the SMS manager 104 determines that, based on the information (obtained at step 210), the SMS segmentation should take place, the method 200 proceeds to step 214. Otherwise, the method 200 proceeds to step 250, where the SMS message is sent without being modified by the remaining steps of the method 200.

Figure 3:
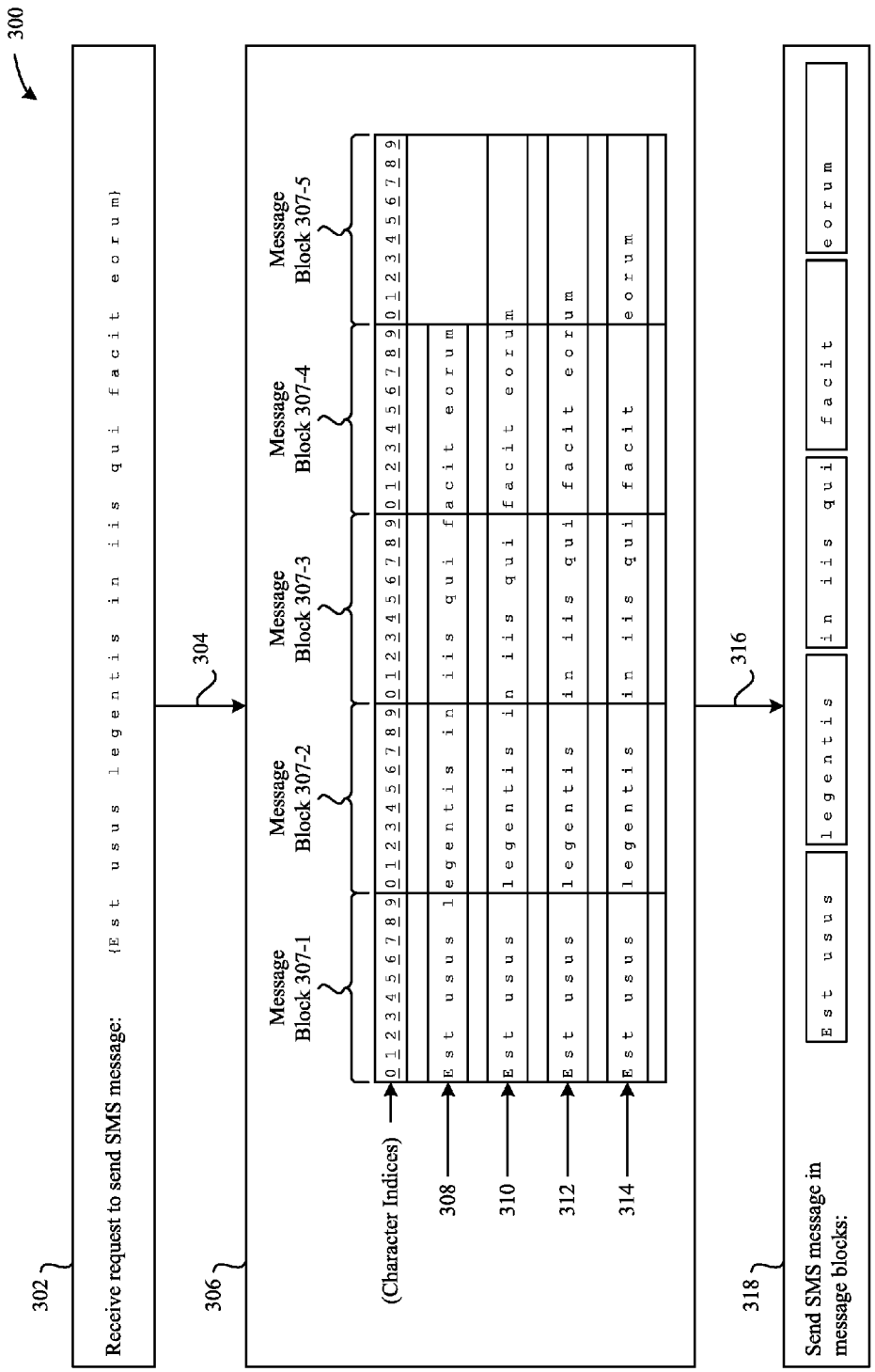
FIG. 3 illustrates a sequence diagram that sets forth the manner in which an SMS manager executing on a wireless device of FIG. 1 carries out an SMS segmentation, according to some embodiments.

At step 214, the SMS manager 104 splits the SMS message into two or more message blocks based on a maximum number of characters for each of the two or more message blocks. Notably, FIG. 3 illustrates a detailed example 300 of an SMS message that is segmented according to steps 214-226, and, for clarity, will be described in conjunction with these method steps. For example, step 302 of FIG. 3 involves an SMS message that includes the characters "Est usus legentis in its qui facit eorum" and an encoding scheme that limits the message blocks to a maximum of ten (10) characters. Accordingly, and in view of step 214, at step 304 of FIG. 3 the SMS message is split into four different message blocks 307-1, 307-2, 307-3, and 307-4, with different portions of the characters separated out into the message blocks 307-{1,2,3,4} according to the illustration provided in element 306 of FIG. 3.

Continuing on, at step 216, the SMS manager 104 sets a first one of the two or more message blocks as a current message block. In correlation to FIG. 3, this would involve, at step 308, setting the current message block as the message block 307-1, which includes the characters "Est usus 1". At step 218, the SMS manager 104 determines whether the current message block (i.e., the message block 307-1) ends with a word that spans the current message block and an adjacent successive message block (i.e., the message block 307-2). Notably, the word "legentis" spans the end of the current message block (i.e., the message block 307-1) and the adjacent successive message block (i.e., the message block 307-2), and, therefore, the result of step 218 would be "YES." Returning to method 200, when, at step 218, the SMS manager 104 determines that the current message block ends with a word that spans the current message block and an adjacent successive message block, the method 200 proceeds to step 220. Otherwise, the method 200 proceeds to step 224, described below.

At step 220, the SMS manager 104, at the starting place of the word within the current message block (i.e., character index 9 of the message block 307-1), shifts all subsequent characters in the SMS message across the message blocks (i.e., message blocks 307-{2,3,4,5}) such that the word is positioned at the beginning of the successive message block (i.e., the message block 307-2). Notably, this step is represented in FIG. 3 as step 310, where the word "legentis" is shifted from the message block 307-1 to the message block 307-2. Moreover, according to step 220, any characters that overflow out of the last message block (i.e., the message block 307-4) are placed into a new message block (i.e., the message block 307-5) that immediately follows the (previously) last message block. As shown in FIG. 3, the first shift that occurs at step 310 causes the "m" character included in the word "eorum" to overflow out of the message block 307-4, thereby requiring a new message block 307-5 to hold the "m" character.

At step 224, the SMS manager 104 determines whether additional message blocks are included in the two or more message blocks established at step 214. Turning again to FIG. 3, the result of step 224 would be "YES" an additional four times as each of the message blocks 307-{2,3,4,5} have not been addressed by the SMS manager 104. Accordingly, when, at step 224, the SMS manager 104 determines that additional message blocks are included in the two or more message blocks, the method 200 proceeds to step 226. At step 226, the SMS manager 104 sets the current message block (i.e., the message block 307-1) to a next one (i.e., the message block 307-2) of the two or more message blocks. Notably, the method steps 218-226 repeat until each of the two or more message blocks—as well as any additional message blocks created by way of overflow—have been addressed by the SMS manager 104. This is represented by all of steps 308-314 illustrated in FIG. 3.

Finally, when, at step 226, the SMS manager 104 determines that no additional message blocks are included in the two or more message blocks, the SMS message is ready to be sent to the destination wireless device 102-2. Accordingly, at step 250, the various message blocks are transmitted to the destination wireless device 102-2, which is represented by steps 316 and 318 in FIG. 3. In turn the destination wireless device 102-2 receives each of the message blocks as individual SMS messages and displays them individually, where no words span between two of the individual SMS messages.

Figure 4:
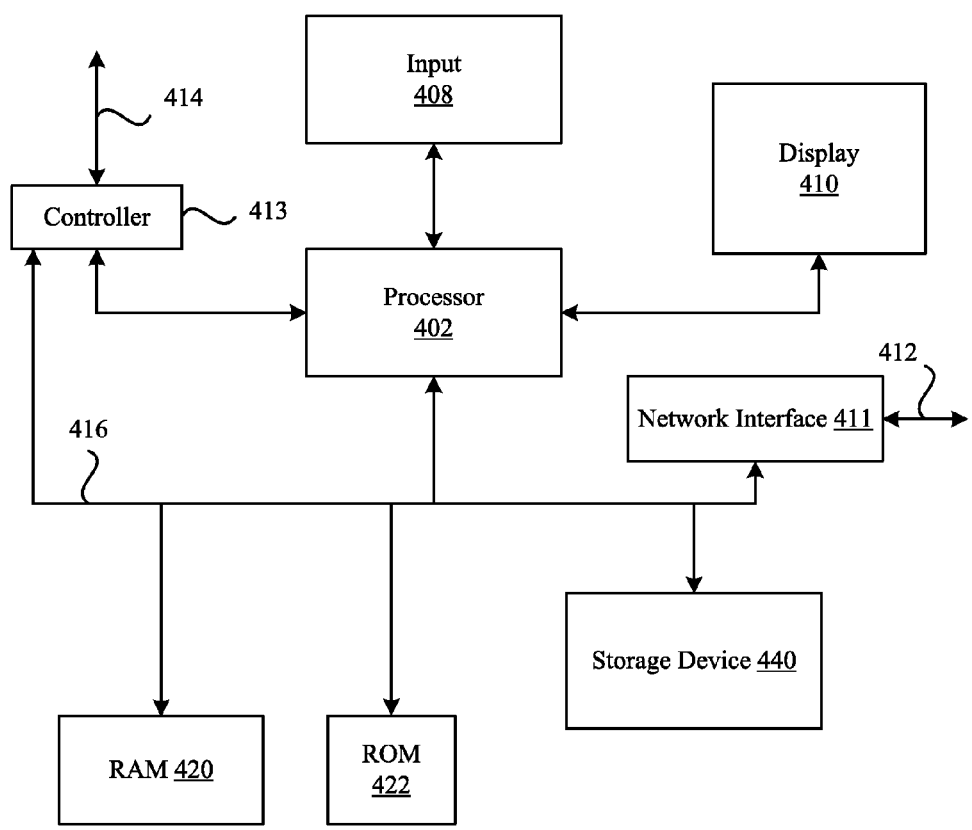
FIG. 4 illustrates a detailed view of a computing device that can be used to implement the various wireless and server devices described herein, according to some embodiments.

FIG. 4 is a block diagram of a computing device 400 that can represent the components of both the source wireless device 102-1, the destination wireless device 102-2, and the server 106. As shown in FIG. 4, the computing device 400 can include a processor 402 that represents a microprocessor or controller for controlling the overall operation of computing device 400. The computing device 400 can also include a user input device 408 that allows a user of the computing device 400 to interact with the computing device 400. For example, the user input device 408 can take a variety of forms, such as a button, keypad, dial, touch screen, audio input interface, visual/image capture input interface, input in the form of sensor data, etc. Still further, the computing device 400 can include a display 410 (screen display) that can be controlled by the processor 402 to display information to the user. A data bus 416 can facilitate data transfer between at least a storage device 440, the processor 402, and a controller 413. The controller 413 can be used to interface with and control different equipment through and equipment control bus 414. The computing device 400 can also include a network/bus interface 411 that couples to a data link 412, where the data link 412 can allow the computing device 400 to, e.g., interface with the base stations 105 illustrated in FIG. 1 and described above. In the case of a wireless connection, the network/bus interface 411 can include a wireless transceiver.

The computing device 400 also include a storage device 440, which can comprise a single disk or a plurality of disks (e.g., hard drives), and includes a storage management module that manages one or more partitions (also referred to herein as "logical volumes") within the storage device 440. In some embodiments, storage device 440 can include flash memory, semiconductor (solid state) memory or the like. The computing device 400 can also include a Random Access Memory (RAM) 420 and a Read-Only Memory (ROM) 422. The ROM 422 can store programs, utilities or processes to be executed in a non-volatile manner. The RAM 420 can provide volatile data storage, and stores instructions related to the components of the SMS manager 104/manager 108 that are configured to carry out the various techniques described herein.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

We claim:

1. A method for conditionally shifting a word that spans across two message blocks of a short message service (SMS) message that each share a fixed character limit, the method comprising:
   at a source wireless device:
      identifying that the word spans across the two message blocks, wherein the two message blocks include a first message block and second message block;
      determining that shifting the word from the first message block to the second message block would cause the fixed character limit of the second message block to be exceeded and require an additional message block to transmit the SMS message;
      in response to determining, analyzing information about a destination wireless device that will receive the SMS to determine whether shifting the word should be carried out;
      when shifting the word should not be carried out:
         sending the two message blocks to the destination wireless device; and
      when shifting the word should be carried out:
         shifting the word from the first message block to the second message block to establish the additional message block, and
         sending the two message blocks and the additional message block to the destination wireless device.

2. The method of claim 1, wherein shifting the word should be carried out when the destination wireless device is associated with a wireless account that includes unlimited SMS messaging.

3. The method of claim 1, wherein shifting the word should be carried out when the destination wireless device is associated with a wireless network provider that is different from a wireless network provider with which the destination wireless device is associated.

4. The method of claim 1, wherein shifting the word should be carried out when the destination wireless device is associated with a first wireless network provider that provides a first data connection technology that is different than a second data connection technology provided by a second wireless network provider with which the source wireless device is associated.

5. The method of claim 1, wherein shifting the word should be carried out when a first model of manufacture of the destination wireless device is a different than a second model of manufacture of the source wireless device.

6. The method of claim 1, wherein the source wireless device determines that shifting the word should not be carried out when the destination wireless device is associated with a wireless account that requires individual payment for each SMS message that is received.

7. The method of claim 1, wherein the word is a combination of alphabetic characters or a combination of numeric characters that is preceded by and/or succeeded by at least one space character or any punctuation character included in a predefined set of punctuation characters.

8. The method of claim 7, wherein the combination of alphabetic characters or the combination of numeric characters is identified using a predefined set of rules.

9. A non-transitory computer readable storage medium including instructions that, when executed by a processor included in a source wireless device, cause the source wireless device to conditionally shift a word that spans across two message blocks of a short message service (SMS) message that each share a fixed character limit, by carrying out steps that include:
   identifying that the word spans across the two message blocks, wherein the two message blocks include a first message block and second message block;
   determining that shifting the word from the first message block to the second message block would cause the fixed character limit of the second message block to be exceeded and require an additional message block to transmit the SMS message;
   in response to determining, analyzing information about a destination wireless device that will receive the SMS to determine whether shifting the word should be carried out;
   when shifting the word should not be carried out:
      sending the two message blocks to the destination wireless device; and
   when shifting the word should be carried out:
      shifting the word from the first message block to the second message block to establish the additional message block, and
      sending the two message blocks and the additional message block to the destination wireless device.

10. The non-transitory computer readable storage medium of claim 9, wherein shifting the word should be carried out when the destination wireless device is associated with a wireless account that includes unlimited SMS messaging.

11. The non-transitory computer readable storage medium of claim 9, wherein shifting the word should be carried out when the destination wireless device is associated with a wireless network provider that is different from a wireless network provider with which the destination wireless device is associated.

12. The non-transitory computer readable storage medium of claim 9, wherein shifting the word should be carried out when the destination wireless device is associated with a first wireless network provider that provides a first data connection technology that is different than a second data connection technology provided by a second wireless network provider with which the source wireless device is associated.

13. The non-transitory computer readable storage medium of claim 9, wherein shifting the word should be carried out when a first model of manufacture of the destination wireless device is a different than a second model of manufacture of the source wireless device.

14. The non-transitory computer readable storage medium of claim 9, wherein the source wireless device determines that shifting the word should not be carried out when the destination wireless device is associated with a wireless account that requires individual payment for each SMS message that is received.

15. A wireless device, comprising:
- at least one wireless interface; and
- a processor configured to cause the wireless device to carry out steps that include:
  - receiving a request to transmit an electronic message to a destination wireless device, wherein the electronic message is comprised of at least a first message block and a second message block, and a word spans across the first message block and the second message block;
  - determining that shifting the word from the first message block to the second message block would require an additional message block to transmit the electronic message;
  - in response to determining, issuing a request to a server for information about the destination wireless device;
  - receiving and analyze the information to determine whether shifting the word should be carried out;
  - when shifting the word should not be carried out:
    - sending, to the destination wireless device, the electronic message as-is; and
  - carrying out the shifting, and send, to the destination wireless device:
    - the first message block,
    - the second message block, and
    - the additional message block established by way of the shifting.

16. The wireless device of claim 15, wherein the steps further include storing the information so that the information is available when the server is not accessible.

17. The wireless device of claim 15, wherein the information includes details about one or more of: a model of manufacture of the destination wireless device, a wireless network provider associated with the destination wireless device, and a wireless account associated with the destination wireless device.

18. The wireless device of claim 17, wherein shifting the word is carried out when the information indicates that the wireless account includes unlimited electronic messaging.

19. The wireless device of claim 15, wherein the word is a combination of alphabetic characters or a combination of numeric characters that is preceded by and/or succeeded by at least one space character or any punctuation character included in a predefined set of punctuation characters.

20. The wireless device of claim 19, wherein the combination of alphabetic characters or the combination of numeric characters is identified via a predefined set of rules.

\* \* \* \* \*